June 28, 1960  B. KAZAN ET AL  2,943,205
RADIANT ENERGY CONTROL APPARATUS
Filed Oct. 31, 1957  2 Sheets-Sheet 1

INVENTORS.
Benjamin Kazan and
James E. Berkeyheiser, Jr.
BY
Morrish Rabkin
ATTORNEY.

INVENTORS.
Benjamin Kazan and
James E. Berkeyheiser, Jr.
BY
ATTORNEY.

United States Patent Office 2,943,205
Patented June 28, 1960

2,943,205

RADIANT ENERGY CONTROL APPARATUS

Benjamin Kazan, Princeton, and James E. Berkeyheiser, Jr., Trenton, N.J., assignors to Radio Corporation of America, a corporation of Delaware Filed Oct. 31, 1957, Ser. No. 693,664

13 Claims. (Cl. 250—206)

The present invention relates to apparatus for controlling the exposure of an electroluminescent device to radiant energy, and more particularly to apparatus for controlling the exposure of electroluminescent devices capable of amplifying the intensity of an image under observation.

Electroluminescent devices of the type which may be incorporated in the present invention are operative as light amplifiers. These devices include a layer of photoconductive material superimposed on a layer of fluorescent material. An electric field is established across the superimposed layers of photoconductive and electroluminescent materials. The photoconductive layer may be illuminated by an image of visible light, X-rays or other forms of radiant energy. The photoconductivity of the layer of photoconductive material is varied in accordance with the exposure to the radiant energy. Consequently, the intensity of the electric field across the elemental portions of the electroluminescent layer varies in accordance with the image formed by the radiant energy incident on the photoconductive layer. An amplified or intensified image for visual observation is provided on the face of the electroluminescent layer.

Since photoconductive materials which are used in light amplifier devices are sensitive to X-rays, such devices may be usel to amplify the intensity of dim images produced in X-ray fluoroscopic examination. The light amplifying devices, therefore, provide means for the observation of X-ray images of portions of the human body otherwise very difficult to observe with conventional radiographic and fluoroscopic techniques. In the past it was impossible to obtain sufficiently bright images on a conventional fluorescent screen with X-ray exposures consistent with safety to the patient under examination.

Devices used in convetnional radiography and fluoroscopy for controlling the exposure of the patient include timers which arbitrarily cut off the X-rays after a predetermined time. More complex means for controlling exposure involve auxiliary photoelectric devices, such as phototubes and cells, responsive to the light from an auxiliary fluorescent screen. The output of the phototubes is used to control means for cutting off X-ray radiation. Such devices necessitate careful alignment of the phototube with the X-ray beam and anatomical part under examination, since the phototube is excited by a small area of the screen. In many cases this exposure of a small area of a fluorescent screen may not accurately indicate the exposure of the patient.

In electroluminescent devices capable of image intensification, the brightness of the visual image corresponding to the X-ray image depends upon the exposure of its photosensitive surface to X-ray illumination. It has been determined, in accordance with the invention, that the magnitude of the current for energizing the electroluminescent device is also determined by the exposure to the exciting radiation. Since the entire area of the electroluminescent device is exposed to the radiation, the present invention provides means for effectively controlling the exposure of the patient to what may be excessive irradiation by means responsive to the magnitude of the current for energizing the electroluminescent device.

Briefly described, control apparatus in accordance with the invention may comprise current responsive means associated with the source of radiant energy for illuminating the electroluminescent device. The electroluminescent device provides an image of a specimen under observation. Such current responsive means may be a relay having its operating winding connected in series with the electroluminescent device. The contacts of the relay may normally be closed to permit the energization of the source of radiant energy, such as an X-ray tube. Consequently, an exposure of the electroluminescent device providing a visual image of sufficient brightness for accurate observation will also call for an energizing current of magnitude sufficient to operate the relay and deenergize the X-ray tube.

It is an object of the present invention to provide a novel system for controlling exposure to radiant energy.

It is a further object of the present invention to provide apparatus for controlling the exposure of an electroluminescent device for amplifying the intensity of incident illumination in accordance with the brightness of the intensified illumination.

It is a still further object of the present invention to provide apparatus for preventing injurious exposure of a patient to X-ray or other inherently dangerous radiation when visual observation of images of portions of the patient's body is conducted.

Other objects and advantages of the present invention will, of course, become apparent and immediately suggest themselves to those skilled in the art to which the invention is directed from a reading of the following description in connection with the accompanying drawing in which.

Figure 1:
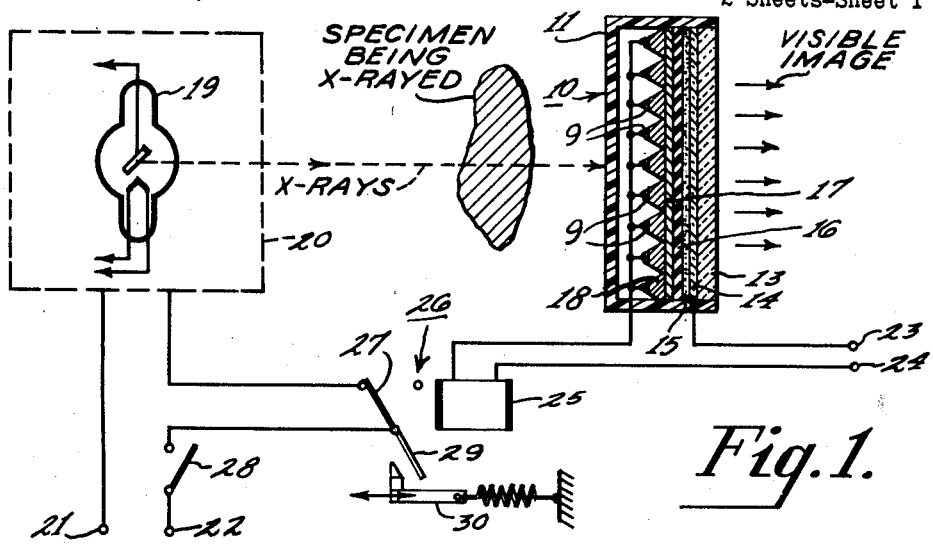
Fig. 1 is a schematic presentation of one embodiment of the present invention.

Referring now to the drawings, Fig. 1 shows a circuit for controlling the exposure of an electroluminescent device to X-rays. While X-rays are indicated, for purposes of illustration in the drawings, it should be understood that the exposure control apparatus provided by the invention is similarly effective in controlling the exposure to other types of radiation, such as alpha rays or electrons and visible light. Thus, the invention may be utilized with electroluminescent devices for controlling exposure to any type of radiation to which such devices are sensitive.

The electroluminescent device shown in Fig. 1 is of the light amplifier type. A cross sectional view of this device is illustrated. The device is a panel structure of small cross-section. For example, the panel may have a total thickness of less than one fourth inch, a length of one or more feet and a height of one or more feet. This panel 10 is enclosed in a rectangular, open sided box 11 of non-conductive material, such as plastic material. One end of the box may be covered by a thin sheet of opaque plastic material such as Bakelite. Bakelite is selected since it transmits the type of radiation to be employed in this illustrative embodiment of the invention. Bakelite is substantially transparent to X-rays. The electroluminescent amplifier device comprises a transparent support member or glass plate 13. A transparent conductive film 14, which may be a film of tin chloride or finely sprayed silver paint, is applied to a surface of the glass plate 13.

A layer of electroluminescent material 15 such as may comprise many of the common phosphors is applied over the conductive film 14. Phosphors of various types, such as copper activated zinc sulphide, zinc beryllium silicate and the like, depending on the desired color output may be suitable. In preparing the electroluminescent layer, the particles of phosphor material are mixed with or are embedded in a light transmitting or insulating material for example a plastic, lacquer, wax or the like. The thickness of the layer 15 of electroluminescent material may be from one to three thousandths of an inch. If desired, a light opaque insulating layer 16 may be applied over the electroluminescent layer 15. Over the opaque layer 16 there may be applied, if desired, a layer 17 of current diffusing material. This current diffusing material may comprise cadmium sulphide which has been made conductive by first adding cadmium chloride and then heating the mixture to about 700 degrees centigrade for twenty minutes. The layer 17 of current diffusing material is followed by a layer 18 of photoconductive material sensitive to the X-ray radiation which will be used. Cadmium sulphide, cadmium selenide and lead sulphide may be used as the photoconductive material, for example. The photoconductive material may be applied in dry powder form. However, in the illustrated light amplifier panel 10, the photoconductive material is mixed with a suitable plastic binder such as ethyl cellulose or methyl methacrylate. Grooves having a triangular cross-sectional shape may be formed in the layer 18 of photoconductive material for permitting the X-ray radiation to more easily penetrate therein and excite the photoconductive material through its entire depth. These grooves each are capped with a line or film 9 of conductive material. It is desirable that the grooves should be small in order to preserve image resolution.

The current-diffusing layer may be omitted if desired. One function of the current diffusing layer 17 is to electrically connect each point of the photoconductive surface to a corresponding point of the electroluminescent surface. The current diffusing layer 17 prevents current flowing through the device from the conductive lines 9 to the transparent conductive film 14 from concentrating at the restricted areas of the phosphor layer 15 corresponding to the bottom of the grooves in the photoconductive layer 18. The current-diffusing layer causes the current at these regions to spread out over a greater area and thereby increases the light emitting area of the phosphor layer 15. The conductive lines 9 and the transparent conductive film 14 provide electrodes whereby an electric field may be established across the layered structure. Thus, the conductive lines may be connected together by a conductor located near an edge of the panel.

In operation, assuming the establishment of an electric field between the electrodes 9 and 14, the greatest potential gradient exists across the photoconductive layer 18 in the absence of X-ray excitation because of the thickness thereof. The potential gradient across the phosphor layer 15 is adjusted by control of the voltage applied across electrodes 9 and 14 to be insufficient to cause electroluminescence in the absence of exciting radiation. In other words, the impedance provided by the photoconductive layer 18 is in series with the impedance provided by the phosphor layer 15. Consequently, the greater part of the voltage applied across the device between the electrodes 9 and 14 will appear across the photoconductive layer. Under these conditions, with no incoming radiation incident on the photoconductor, no light is emitted from the phosphor.

When X-ray radiation is incident upon the photoconductive material, the conductivity of the elemental areas of the photoconductor excited by the radiation will increase. Conducting paths are then provided across the photoconductive layer 18. This increase in conductivity manifests itself in a drop in the impedance provided by the photoconductor, which impedance drop is a function of the intensity of the incident radiation. The voltage drop across portions of the photoconductive layer is therefore decreased. Consequently, a corresponding increase in voltage appears across the phosphor in an area directly adjacent the excited areas of the photoconductor. The phosphor is thus caused to emit light in this area. It follows that a visible image of an X-ray image incident on the photoconductor can be produced on the surface of the phosphor layer 15.

The average conductivity of the phosphor layer is determined by the exposure to the incident X-ray radiation. For example, the conductivity of the photoconductive layer may be increased by an exposure due to the incidence thereon of intense X-rays for a short period of time. An equal exposure due to less intense X-rays which are present for a greater period of time will cause a similar amount of increase in photoconductivity.

The brightness of the visible image produced on the phosphor surface is determined by the increase in conductivity of the photoconductive layer 18 and is, therefore, related to exposure. Since the electric field applied to the phosphor layer 15 increases as the impedance of the photoconductive layer 18 decreases, the greater the radiation absorbed by the photoconductive layer the greater the brightness of the image. Increasing conductivity in various elemental areas of the material produces an increase in conductivity of the photoconductive layer 18 as a whole which is related to the average brightness of the image and the corresponding average exposure of the photoconductive layer 18 to X-ray radiation. The current through the electroluminescent device will, therefore, increase with the increasing total brightness of the reproduced image.

In accordance with the present invention, this increase in current flow through the device is used to control exposure of the electroluminescent light amplifier and consequently the exposure of a patient undergoing X-ray examination in equipment utilizing an electroluminescent device of the light amplifier type. It will be observed that the light amplifier device not only provides the visible image of the X-ray image under observation, but also is effective to control the exposure of the patient to X-rays and therefore prevents injury due to overexposure. The output illumination from the amplifier can be automatically monitored to provide proper exposure for photographing the X-ray image.

In the drawing, an X-ray tube 19 is shown as enclosed by the block 20 which represents the X-ray source in order to simplify the illustration. This X-ray source may be a conventional diagnostic X-ray apparatus including a power supply and associated apparatus. Power for energizing the X-ray tube 19 is supplied from a pair of terminals 21 and 22 which are adapted to be connected to the power lines.

Another pair of terminals 23 and 24 are also adapted to be connected to a source of power for operating the electroluminescent light amplifier device 10. It is more suitable to operate the electroluminescent device from an alternating current power source. The power lines may be a convenient source of power. The electrode of the electroluminescent light amplifier device 10 provided by the conductive film 14 is connected to one of the terminals 23. The other terminal 24 is connected to the operating winding 25 of a relay 26. The other electrode of the electroluminescent light amplifier device 10, which is provided by the interconnected conductive lines 9, is connected to the operating winding 25 of the relay 26. Thus, the operating winding 25 of the relay 26 is in series with the electroluminescent light amplifier device 10. Current flowing through the electroluminescent device 10, between the electrodes 9 and 14, will therefore also flow through the operating winding of the relay 26. The relay 26 has a pair of contacts 27 which are connected through a switch 28 to a terminal 22 of the terminals which are connected to the X-ray source 20. The movable one of the contacts 27 has an extension 29 which cooperates with a latching mechanism 30 so that, when the relay 26 pulls in, the contacts 27 open and the catch extension 29 catches on the latch mechanism 30 so as to retain the contacts 27 in open position. In order to release the contacts 27, the latch mechanism may be moved against a spring bias to release the catch extension 29. The relay 26 pulls in when a current of greater than a predetermined magnitude passes through the operating winding 25. The magnitude of this pull-in current is selected by reference to the current (conductivity)-exposure (brightness) characteristic of the device 10 so that overexposure to X-rays is made impossible.

In operation, the switch 28 will be closed and the X-ray source 20 energized through the contacts 27 of the relay 26. When the exposure of the light amplifier 10 reaches a preset maximum exposure, the current through the operating winding 25 of the relay 26 will be sufficient to cause the contacts 27 to open as the relay pulls in. The catch extension 27 latches on the cooperating latch mechanism 30. Then, the power to the X-ray source is cut off and X-ray radiation therefrom ceases. For subsequent exposures, as for example when another image is to be viewed, the latch 30 is released in order for the X-ray radiation to be reinitiated.

Figure 2:
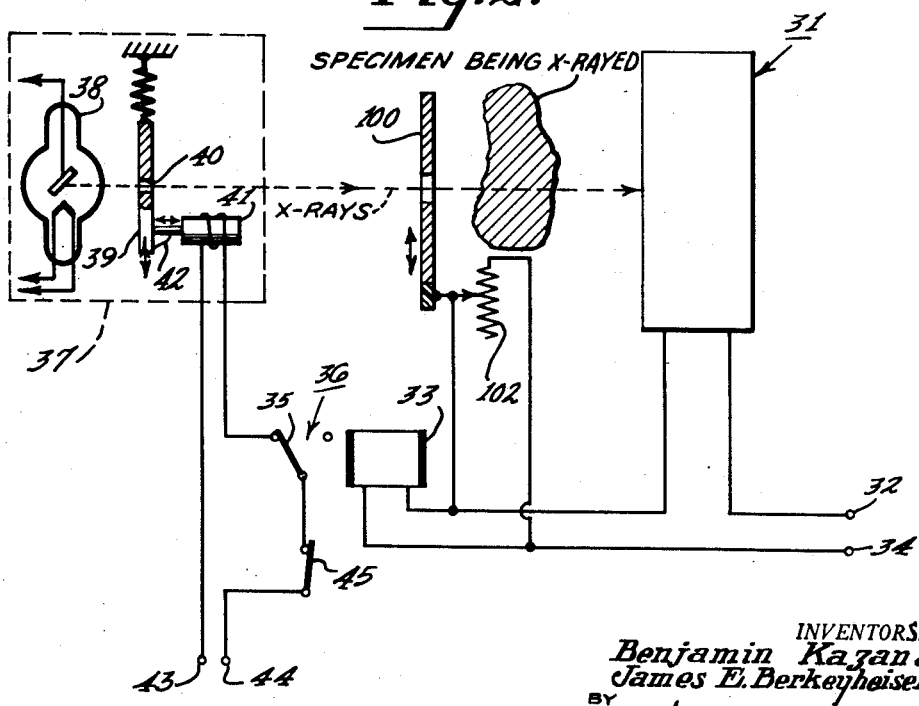
Fig. 2 is a schematic presentation of another embodiment of the present invention.

Similar operation is provided by the apparatus illustrated in Fig. 2 of the drawings. The electroluminescent, light amplifier panel device 31 is shown in more schematic form than was the panel device 10 (Fig. 1). It will be appreciated that the panel 31 may be similar to the device 10.

The electrodes which provide means for establishing the electric field for operating the panel 31 are connected to a terminal 32 and a relay operating winding 33. Another terminal 34 may also be connected to the relay operating winding 33. The terminals 32 and 34 are adapted to be connected to a source of alternating current voltage for energizing the light amplifying panel 31. Since the relay operating winding 33 is in series with the light amplifying panel 31, current passing through the panel 31 will also pass through the relay operating winding. The relay 36 includes a pair of contacts 35. These contacts are closed when the relay is not energized. An X-ray source 37 is shown illustratively as comprising the X-ray tube 38. A shutter 39 having an aperture 40 and a latch 42 is interposed in the path of X-rays from the X-ray tube 38. A solenoid 41 cooperates with the latch 42 to prevent the shutter from moving in response to a spring bias unless the solenoid 41 is deenergized. When the solenoid 42 is energized, as shown in the drawing, the aperture 40 is disposed in the path of X-rays from the X-ray tube 38 and radiation from the X-ray tube 38 passes through the shutter 39. The solenoid 41 is energized from the terminals 43 and 44 which may be connected to a source of operating voltage such as the power lines. A switch 45 is connected between one of the terminals 44 and the contacts 35 of the relay 36. Thus, when the switch 45 and the contacts 36 are closed, the solenoid is energized and the plunger thereof remains in contact with the latch 42. In this case, radiation from the X-ray tube may pass through the aperture 40 to be incident on the panel 31. After a predetermined exposure of the panel 31, the current through the relay operating winding 36 increases sufficiently to cause the contacts 35 to open. Consequently, the solenoid 41 is deenergized and the plunger thereof withdrawn from the latch 42. The shutter then closes and X-ray excitation of the light amplifier panel 31 is terminated.

In some radiographic apparatus, it is desirable to use an adjustable aperture forming device or diaphragm 100. This diaphragm is schematically illustrated by lead plates which are movable with respect to each other. The diaphragm may be used to localize the anatomical part to be observed. A greater than usual amount of radiation may be tolerated by the patient, if such radiation is limited to certain small areas of his body. Therefore, it may be desirable to decrease the sensitivity of the relay 36.

To this end a potentiometer resistor 102 is connected across the operating winding 33. The movable arm of the potentiometer is connected to move with one plate of the diaphragm 100. The sensitivity of the relay increases and decreases in accordance with the size of the aperture formed by the diaphragm 100, since the value of shunt resistance changes with movement of the arm of the potentiometer 102. If desired, a similar relay sensitivity control arrangement may be used in the other illustrated embodiments of the invention.

Figure 3:
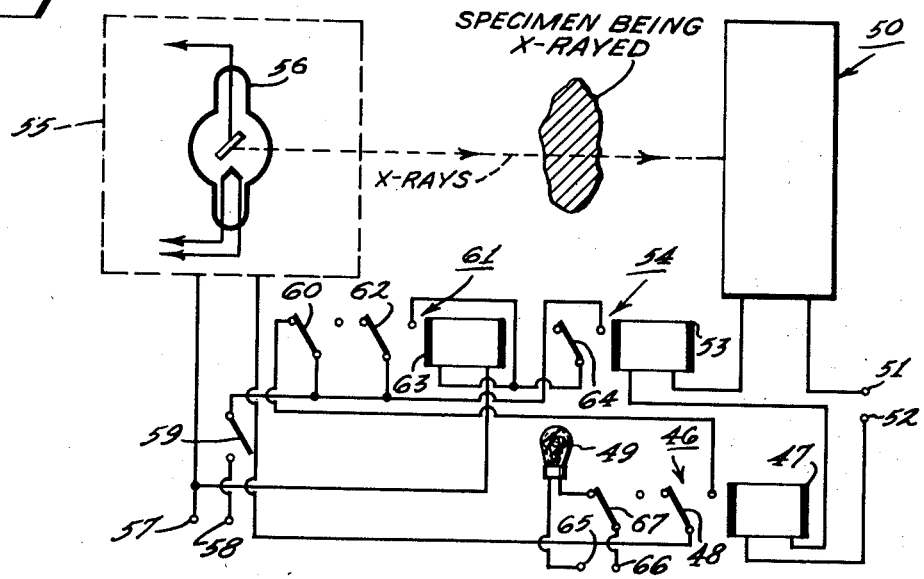
Fig. 3 is a schmeatic presentation of still another embodiment of the present invention.

A more complex, self-latching relay system for controlling the exposure of an electroluminescent light amplifier panel to X-ray radiation is shown in Fig. 3. The light amplifier panel 50 is shown schematically in Fig. 3. This panel may be similar to the panel shown in Fig. 1. Electrical connections are made to the energizing electrodes of the panel 50. These electrical connections to the panel are also connected to a pair of terminals 51 and 52. The terminals 51 and 52 are adapted to be connected to a source of alternating current energizing voltage for the panel 50. One of the terminals 52 is connected to the panel 50 through the operating winding 53 of the relay 54 and the operating wind 47 of another relay 46. The relay 54 performs a control function in the relay circuit. The other relay may be used, only if desirable, to control an auxiliary source of illumination, shown illustratively as a lamp 49, which provides the threshold radiation for the panel 50. A unique auxiliary source of illumination is described in a patent application, Serial No. 693,663, filed concurrently herewith in the names of Benjamin Kazen and James E. Berkeyheiser, Jr., and entitled, Electroluminescent Apparatus. A source of X-rays 55 is also provided. This X-ray source 55 is schematically indicated as including an X-ray tube 56. The tube 56 may be connected in a conventional manner to a source of operating voltage as might be obtained from a high voltage power supply therein. As was the case in the other embodiment of the invention, the X-ray tube is spaced from the photoconductive surface of the panel 50 so that the specimen or patient being examined may be located therebetween. For example, the panel 50 may be located in place of the usual fluorescent screen in a conventional X-ray diagnostic apparatus. The patient may be disposed next to the panel 50. The power lines which provide the power for operating the X-ray source 55 may be connected to a pair of terminals 57 and 58. A switch 59 is connected to one of the terminals 58. The switch 59 is in turn connected to the X-ray source 55 through the back contacts 60 of another relay 61 and the contacts 48 of the auxiliary illumination control relay 46. The front contacts 62 of the relay 61 are holding contacts.

For initiating the operation of the apparatus, the switch 59 is closed. Power is connected to the X-ray source 55 through the back contacts 60 of the relay 61 upon closure of the contacts 48 of the relay 46. The terminal 57 is directly connected to the X-ray source. The relay 47 is more sensitive than the relay 54 and is set to operate as soon as the threshold radiation is provided by the lamp 49. The lamp 49 is connected, through the back contacts 67 of the relay 46, across a pair of power line terminals 65 and 66. The contacts 67 open as soon as the threshold radiation is provided and the contacts 48 close so that the X-ray source 55 is made operative. The circuit for energizing the operating winding 63 of the relay 61 extends from one side of the power line at the terminal 57, through the normally open contacts 64 of the relay 54, and the switch 59 to the other power line terminal 58. When the exposure of the panel 50 attains a predetermined magnitude, the current through the relay operating winding 53 increases sufficiently to cause the relay 54 to pull in, thereby closing the contacts 64. When the contacts 64 are closed, the relay operating winding 63 of the relay 61 is energized and the contacts 60 and 62 of the relay 61 pull in. When the contacts 60 open, the power from the lines to the X-ray source 55 is cut off. Therefore, the X-ray radiation from the source 55 is interrupted. The holding contacts 62 of the relay 61 close simultaneously with the back contacts 60 when the relay is operated. The relay is then energized by way of a circuit through the holding contacts 62 so that the relay 63 is maintained open although the control relay 54 may drop back to normal deenergized condition. The control relay 54 normally becomes deenergized after radiation to the panel 50 ceases. However, for subsequent exposures, the switch 59 must be reopened in order to deenergize the relay 63. The auxiliary lamp control arrangement may be used, if desired, in the other embodiments of the invention.

Figure 4:
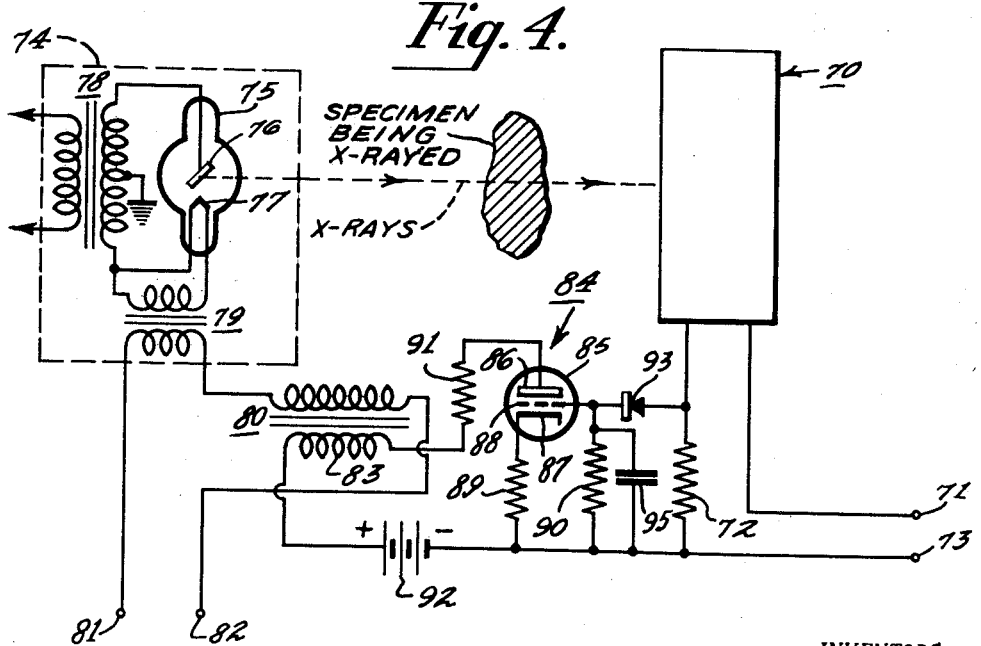
Fig. 4 is a schematic presentation of yet another embodiment of the present invention.

An embodiment of the invention illustrated in Fig. 4 permits the control of the exposure of an electroluminescent light amplifier device, by regulating the intensity of irradiation thereof. The light amplifier device is schematically shown as a panel structure 70 of the type heretofore illustrated. Connections are brought from the electrodes of the device. These connections extend to a terminal 71 and to a resistor 72 to another terminal 73. The terminals 71 and 73 may be connected to a source of alternating current operating power for the panel 70. The X-ray source 74 is shown illustratively as being enclosed by the dash lines. This source is schematically illustrated as including an X-ray tube 75 having an anode or target electrode 76 and a cathode electrode 77. The secondary winding of a high voltage power transformer 78 is connected across the tube from the anode 76 to the cathode 77. The primary winding of this transformer 78 may be connected to a source of operating power such as the alternating current power lines. Current for energizing the cathode 77 which is of the filamentary type is obtained through a filament transformer 79. The primary winding of this filament transformer 79 is connected in series with a saturable reactor 80 to a pair of terminals 81 and 82. The power lines are adapted to be connected to a pair of terminals 81 and 82. The saturable reactor 80 has a control winding 83.

The intensity of X-ray radiation from the X-ray tube 75 is controlled by varying the filament or cathode current in the X-ray tube. Control of the filament current is obtained by varying direct current through a control winding 83 of the saturable reactor 80. By increasing the current to the control winding 83, the impedance of the saturable reactor 80 increases, thereby decreasing the current from the power lines which is available for the filament transformer 79.

In order to control the direct current through the control winding 83, a control amplifier 84 is used. This control amplifier is responsive to the magnitude of the current passing through the light amplifier panel 70. For increasing current through the panel 70, the amplifier 84 increases the current through the control winding 83 thereby decreasing the current to the filament 77 of the X-ray tube 75, that the intensity of X-ray radiation from the tube 75 will be decreased. There is therefore an inverse relationship between the exposure of the light amplifier panel and the intensity of the X-rays from the source 74.

The control amplifier includes an electron tube 85 having an anode 86, cathode 87 and grid 88 electrodes. The heater is not shown for purposes of simplification of the drawing. A cathode resistor 89 is connected to the cathode. A grid resistor 90 is connected between the cathode resistor and the grid. The anode circuit of the amplifier 84 includes a load resistor 91 which is connected through the control winding 83 of the saturable reactor 80 to a source of operating potential for the amplifier 84, schematically illustrated herein as a battery 92. A rectifier 93 illustrated herein as a semiconductor diode is connected between the grid 88 of the tube 84 and the panel 70 so that the alternating current passing through the panel 70 and the resistor 72 will be rectified to provide a direct current control voltage for the amplifier 84. This control voltage will appear across the grid resistor 90. A capacitor 95 may be connected in shunt with the grid resistor 90 to smooth the control voltage waveform, if desired.

When the alternating current through the panel 70 increases, the direct current control voltage applied to the grid 88 in the amplifier stage 84 will increase, thereby increasing the current through the tube 85. Thus, increased current will pass through the control winding 83 of the saturable reactor 80 so as to decrease the filament current passing to the X-ray tube 75.

Through the use of the control circuit illustrated in Fig. 4, X-ray exposures of a specimen or patient under observation may be prolonged without the danger of excessive exposure of the patient to injurious radiation. Such prolonged exposure may be desirable when a light amplifier panel is used for fluoroscopic examination. The characteristics of light amplifier panels are that a time interval is required after examination begins for the visual image to build up in intensity. After the initial buildup, the panel is responsive to changes in the image being observed. Therefore, the relatively weak illumination provided through the use of the control circuit of Fig. 4 after a prolonged examination will be sufficient in providing a visible image for continued observation.

What is claimed is:

1. Radiant energy control apparatus comprising a source of radiation, an electroluminescent device comprised of a light amplifier panel including a layer of electroluminescent material and a layer of photoconductive material adjacent thereto, said layer of photoconductive material being disposed to have radiation from said source incident thereon and having a variable impedance characteristic in response to said radiation, means for varying the intensity of radiation from said source radiated to said device, and means electrically connected to said device and cooperatively associated with said radiation intensity varying means responsive to the total exposure of said device to said radiation for operating said radiation intensity varying means to vary the intensity of said radiation inversely with respect to the exposure of said device.

2. Radiant energy control apparatus comprising a source of radiation and an electroluminescent device including a layer of electroluminescent material and a layer of photoconductive material superimposed on said layer of electroluminescent material, said layer of photoconductive material comprising material having a variable impedance characteristic in response to said radiation, said device being exposed to said radiation, a circuit establishing a path for energizing current to said device, means for interrupting said radiation from said source on said device, and means coupled to said interrupting means and connected in said circuit responsive to the total exposure of said device to said radiation for operating said interrupting means.

3. Radiant energy control apparatus comprising a source of radiation, an electroluminescent device comprised of a layer of electroluminescent material and a layer of photoconductive material of variable impedance superimposed thereon for intensifying an image of said radiation, and means for decreasing the intensity of the radiation from said source including an electromechanical device electrically coupled to said electroluminescent device and mechanically coupled to said source of radiation, said electromechanical device being responsive to the current passing through said electroluminescent device for operating said intensity decreasing device when said current has a magnitude greater than a predetermined magnitude.

4. The invention as defined in claim 3 wherein said electromechanical device is a relay having an operating winding and a pair of contacts, said operating winding being connected in series with said electroluminescent device, and said contacts being connected to said source of radiation.

5. The invention as defined in claim 4 including a latch mechanism, and a member coupled to said contacts of said relay cooperating with said latch mechanism and movable into latched position when said relay is energized.

6. Radiant energy conrtol apparatus comprising an electroluminescent light amplifier device, means for providing a source of radiation for illuminating a surface of said device, a shutter having an aperture therein for interrupting the passage of said radiation between said source and said surface of said device, said shutter including a tripping arrangement comprising a solenoid having a plunger, a latch on said shutter engageable with said plunger, a relay having an operating winding and a pair of normally closed contacts, said winding being connected in series with said electroluminescent device, and said solenoid being connected in series with said contacts, and means responsive to the current passing through said device for operating said shutter to block said radiations on said surface of said device when the magnitude of said current is greater than a predetermined magnitude.

7. Radiant energy control apparatus comprising a source of radiant energy, means for applying a voltage to said source for operating said source to provide said radiant energy, an electroluminescent device for intensifying the image of said radiant energy, said electroluminescent device being disposed to receive radiation from said source, a first relay having an operating winding and a pair of normally closed contacts, a second relay having an operating winding, a pair of normally open front contacts and a pair of normally closed back contacts, a connection from said voltage supply means to said radiation source through said back contacts of said second relay, said operating winding of said first relay being connected in series with said electroluminescent device for operation in response to the passage of current having a magnitude greater than the predetermined magnitude through said device, said operating winding of said second relay being connected in series with said contacts of said first relay to said voltage source, and said operating winding of said second relay also being connected in series with said front contacts across said voltage source whereby said second relay is operated in response to the passage of current of said predetermined magnitude through said first relay and is maintained operative by current passing through said front contacts.

8. Apparatus for controlling the intensity of radiation from an X-ray tube, said tube having a target anode and an electron emissive cathode, said apparatus comprising an electroluminescent light amplifier device adapted to be illuminated by radiation from said X-ray tube, means for applying a high operating voltage between said cathode and said anode of said tube, means for applying heating current to said cathode of said tube, and means responsive to the current passing through said device for varying the magnitude of said heating current inversely with respect to the magnitude of said current through said device.

9. The invention as defined in claim 8 wherein said means for varying said heating current comprises an amplifier having an input circuit and an output circuit, a saturable reactor, said saturable reactor being connected in series with said cathode, said saturable reactor also having a control winding, means for connecting said control winding in said output circuit, and means for connecting said electroluminescent device in said input circuit.

10. Radiant energy control apparatus comprising a source of radiation and an electroluminescent device exposed to said radiation, an auxiliary source of radiation for providing the threshold illumination for said device, means for controlling said radiation from said source, means for controlling said radiation from said auxiliary source, and means responsive to the current passing through said device for interrupting said radiation from said auxiliary source and initiating said radiation from said first-named source of radiation when said current reaches a first magntiude, and means responsive to said current through said device for interrupting radiation from said first-named source when said current reaches a second magnitude higher than said first magnitude.

11. The invention as set forth in claim 10 wherein said means responsive to said current passing through said device includes different relays connected in series with said device.

12. Radiant energy control apparatus comprising a source of radiation, an electroluminescent device exposed to said radiation for establishing an observable image of an object in the path of said radiation projected thereon, a diaphragm for providing an aperture of adjustable size, said diaphragm being disposed between said object and said source of radiation, means for decreasing the intensity of said radiation from said source, means responsive to the current passing through said device for operating said intensity decreasing means, and means for controlling the sensitivity of said last-named means in relation to the size of said aperture in said diaphragm.

13. The invention as set forth in claim 12 wherein said means associated with said interrupting means includes a relay having an operating winding, said operating winding being connected in series with said device, and said means for controlling the sensitivity of said last-named means includes a potentiometer connected across the operating winding of said relay, said potentiometer having an arm movable with said diaphragm for adjusting the value of resistance across said relay operating winding.

References Cited in the file of this patent

UNITED STATES PATENTS

| | | |
|---|---|---|
| 2,537,914 | Roop | Jan. 9, 1951 |
| 2,567,896 | Semm | Sept. 11, 1951 |
| 2,650,310 | White | Aug. 25, 1953 |
| 2,747,104 | Jacobs | May 22, 1956 |
| 2,763,853 | Grant | Sept. 18, 1956 |

UNITED STATES PATENT OFFICE
CERTIFICATE OF CORRECTION

Patent No. 2,943,205                            June 28, 1960

Benjamin Kazan et al.

It is hereby certified that error appears in the printed specification of the above numbered patent requiring correction and that the said Letters Patent should read as corrected below.

Column 1, line 40, for "usel" read -- used --; line 49, for "convetnional" read -- conventional --; column 2, line 41, for "schmeatic" read -- schematic --; column 6, line 26, for "wind" read -- winding --; column 7, line 62, before "that" insert -- so --; column 9, line 11, for "conrtol" read -- control --; column 10, line 22, for "magntiude" read -- magnitude --.

Signed and sealed this 11th day of April 1961.

(SEAL)
Attest:

ERNEST W. SWIDER
Attesting Officer

ARTHUR W. CROCKER
                                           Acting Commissioner of Patents